(12) United States Patent
Pandya

(10) Patent No.: US 7,376,730 B2
(45) Date of Patent: May 20, 2008

(54) METHOD FOR CHARACTERIZING AND DIRECTING REAL-TIME WEBSITE USAGE

(75) Inventor: Aroopratan D. Pandya, Hughsonville, NY (US)

(73) Assignee: International Business Machines Corporation, Armonk, NY (US)

( * ) Notice: Subject to any disclaimer, the term of this patent is extended or adjusted under 35 U.S.C. 154(b) by 1382 days.

(21) Appl. No.: 09/974,373

(22) Filed: Oct. 10, 2001

(65) Prior Publication Data

US 2003/0069962 A1 Apr. 10, 2003

(51) Int. Cl.
*G06F 15/173* (2006.01)

(52) U.S. Cl. ............... 709/224; 709/203; 709/217; 709/219; 340/500; 340/540; 340/539.1

(58) Field of Classification Search ........... 709/224, 709/223, 201
See application file for complete search history.

(56) References Cited

U.S. PATENT DOCUMENTS

| | | | | |
|---|---|---|---|---|
| 5,732,218 | A | 3/1998 | Bland et al. ............... | 709/224 |
| 5,870,559 | A | 2/1999 | Leshem et al. ............ | 709/224 |
| 6,144,962 | A | 11/2000 | Weinberg et al. .......... | 707/10 |
| 6,145,089 | A * | 11/2000 | Le et al. .................... | 714/4 |
| 6,182,097 | B1 | 1/2001 | Hansen et al. ............. | 715/526 |
| 6,363,421 | B2 * | 3/2002 | Barker et al. .............. | 709/223 |
| 6,370,656 | B1 * | 4/2002 | Olarig et al. .............. | 714/23 |
| 6,449,739 | B1 * | 9/2002 | Landan ...................... | 714/47 |
| 6,487,590 | B1 * | 11/2002 | Foley et al. ............... | 709/223 |
| 6,686,838 | B1 * | 2/2004 | Rezvani et al. ............ | 340/506 |
| 6,748,550 | B2 * | 6/2004 | McBrearty et al. ......... | 714/4 |
| 6,789,122 | B1 * | 9/2004 | Slaughter et al. ......... | 709/229 |
| 2002/0021665 | A1 * | 2/2002 | Bhagavath et al. ........ | 370/229 |
| 2002/0111996 | A1 * | 8/2002 | Jones et al. ............... | 709/203 |
| 2002/0169867 | A1 * | 11/2002 | Mann et al. ............... | 709/224 |
| 2003/0023877 | A1 * | 1/2003 | Luther et al. ............. | 713/201 |

OTHER PUBLICATIONS

"Netcool product integration paper", Micromuse 1999.*
"New products for week of Jul. 1", McLaughlin, John, SunWorld, Jul. 1996.*
"Performance Testing IBM MQSeries Infrastructure", Commerce Quest, 2001.*
"Flap Manual", The Regents of the University of California, 1998.*

\* cited by examiner

*Primary Examiner*—Bunjob Jaroenchonwanit
*Assistant Examiner*—Dohm Chankong
(74) *Attorney, Agent, or Firm*—Gibb & Rahman, LLC; Derek S. Jennings

(57) ABSTRACT

A system maintains a communication connection between a client computer and a server computer connected over a network. The system that has a server application runs on the server computer and a client application runs on the client computer. Also, the client application will periodically send a status signal to the server application. The status signal informs the server computer that the client computer has maintained a connection with the server computer. Further, the server application will maintain statistics on client computers connections based on status signals received from the client application.

29 Claims, 2 Drawing Sheets

METHOD FOR CHARACTERIZING AND DIRECTING REAL-TIME WEBSITE USAGE

BACKGROUND OF THE INVENTION

1. Field of the Invention

The invention relates to tools for allowing a Website content provider the ability to channel visitors to an active Website by use of activity messages on a real-time basis.

2. Description of the Related Art

An important feature of Website management is the ability to track user (visitor) activity and behavior patterns with respect to a Website and to graphically display this information (using color coding, annotations, etc.) on the site map. Prior methods that deal with this problem include U.S. Pat. No. 6,144,962 that uses an action tracker plug-in, which gathers user activity data by retrieving and analyzing server log files commonly maintained by Web servers. Using this feature, a Webmaster can view site maps which graphically display such information such as the most frequently-accessed URLs, the most heavily traveled links and paths, and the most popular site entry and exit points. Such an ability for viewing information in the context of a site map greatly simplifies the task of evaluating and maintaining Website effectiveness. Another example of this method is taught in U.S. Pat. No. 5,732,218 which teaches an information network of clients and servers. A service management system of a server gathers data from the server and from the clients for managing an information service Information management data is gathered on a client by extensions to a browser and is periodically reported to the service management system.

Standard Web servers commonly maintain server access log files ("log files") which include information about accesses to the Website by users. These files are typically maintained in one of two standard formats: the HTTP Server Access Log File format, or the HTTP Server Referrer Log File format. Both of these formats are commonly used by Web servers available from Microsoft, Netscape, and NSCA, and both formats are supported by Astra. Each entry (line) in a log file represents a successful access to the associated Website, and contains various information about the access event. This information normally includes: the path to the accessed URL, an identifier of the user (typically in the form of an IP address), and the date and time of the access. Each log file stored on a physical server typically represents some window of time, such as one month and is not used in concurrent activity by a Web user.

U.S. Pat. No. 6,182,097 (hereinafter referred to as '097 patent) entitled "Method for characterizing and visualizing patterns of usage of a Website by network users," which is hereby incorporated by reference, also teaches a system for displaying information pertaining to the usage of Web pages. This system comprises first and second Websites. The first Website comprises plural Web-component files, each having a name in a Website directory. The second Website comprises plural statistics files, each containing usage information about a corresponding Web-component file or subdirectory of Web-component files. The '097 system further comprises a computing device that has a display screen which is operable by a user, and is in communication with the first and second Websites. The computing device is operated under the control of Web-browser software effective for displaying, on the screen, Web components of the respective Websites. The '097 computing device is effective for requesting and retrieving, from either of the Websites, data that correspond to user-designated Web components, and it is effective for directing a data request to either of the Websites in response to user-designation of a Web-component from the other Website. However, in these current Web environments, there is no way to know of the real-time activity on these Websites. Although these above-mentioned ways of logging visits to a particular Website are now commonplace, the ability to log activity on a real-time basis is not currently achieved. Current log files provide no more than a history of what a user has viewed. No other information such as when they went to another Website or followed a link is captured by such methods. For many Website activities, such as online-discussions and e-conferences, there is a need to keep track of where users are on a particular Website, to allow a user to access information in a real-time setting for navigating to these activities. The invention tracks this information and avoids placing a burden on the user to install and download plug-ins or Web-components.

SUMMARY OF THE INVENTION

In view of the foregoing and other problems, disadvantages, and drawbacks of conventional Website navigational methods and systems, the present invention has been devised, and it is an object of the present invention to provide an improved method and system in a client-server environment for allowing navigation to active Website links using a subscription-based system.

The invention includes a system that maintains a communication connection between a client computer and a server computer connected over a network. A server application runs on the server computer and a client application runs on the client computer. Also, the client application will periodically send a status signal to the server application. The status signal informs the server computer that the client computer has maintained a connection with the server computer. Further, the server application will maintain statistics on client computers connections based on status signals received from the client application. When the server application does not receive the status signal from the client application within a predetermined time period, the server application then determines that the client computer is no longer connected to the server computer. In addition, the client application is sent from the server application when the client computer initially forms a connection with the server computer. This client application is a self-contained application that runs on the client computer independently of the server application.

The status signal includes information regarding what server resource the client is communicating with. The status signal has a disconnection signal that informs the server application that the client computer is disconnecting from the server computer. The client application comprises a JAVA applet.

Another embodiment of the invention includes a method that maintains a communication connection between a client computer and a server computer connected over a network. The method entails sending, by a server application which runs on the server computer, a client application to the client computer when the client computer establishes communication with the server computer and periodically sending, by the client application, a status signal to the server application.

To attain the objects suggested above, there is provided, according to one aspect of the invention, a computer network having a Website system that has a subscribing client interface link with functional capabilities that include visualizing dynamic user activity on the current site, thus giving a more powerful navigation tool. This will allow the user to see where and what the other users are doing on this Website. For online Discussion and E-Conferences this is one of the most important pieces of information that can be relayed to the user since there is no clear and easy way to find out which discussions or conference rooms are popular among the users. At the same time it facilitates visualization of the dynamic user activity and also facilitates plotting the visual information on a map to identify which geography the users are coming from to different discussions and conference rooms.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

The invention keeps track of all the users and where they have traversed a Website using an activity message to the server. This activity message contains a unique key, which provides the state of the user actively looking a Website (as to whether the user is looking at the Website or not, and if not, what they are looking at). This information is sufficient to determine current activity of that Website when combined from all the users. The invention is used in a computing network that includes one or more servers and several client computing terminals having a navigating browser. The preferred communicating architecture language is a platform independent language such as Java by Sun Microsystems.

Raw data of Website activity by users is sent to a server. When the user leaves the site or follows a link, an activity message stops. This activity message can be controlled simply by sending a 1 (live) or 0 (dead) signal to the server. This allows site administrators to know what is currently occurring with their Website and aids in navigation of the Website for a new user by displaying such raw data in some navigable format. The details of the display and mapping of such information are well-known to those ordinarily skilled in the art and are not discussed in detail herein, so as to not unnecessarily obscure the salient features of the invention.

Figure 1:
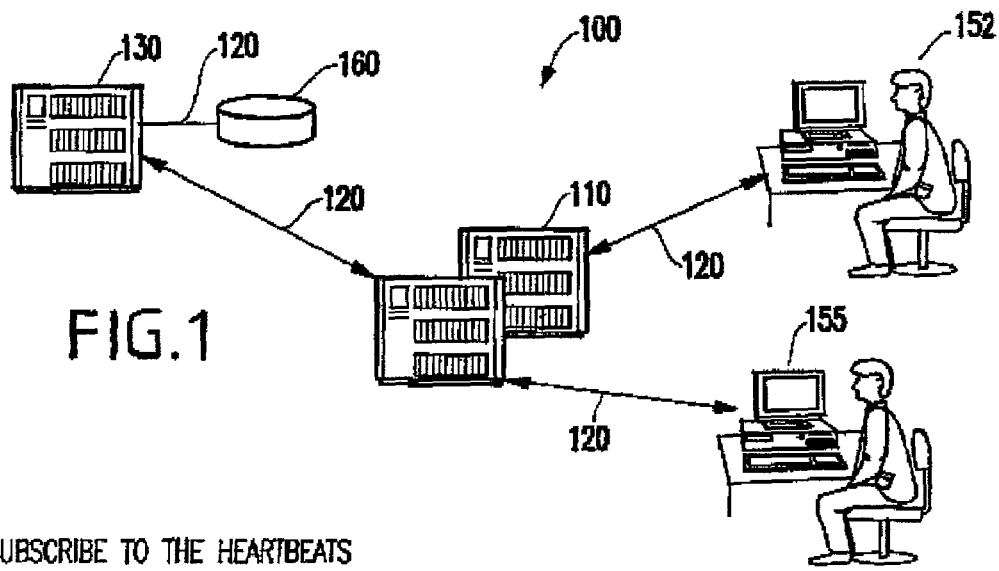
FIG. 1 is a diagram showing a computer network environment in which the present invention operates.

Referring now to FIG. 1, hardware and architecture for a system network 100 according to the present invention is shown in exemplary form. The computer network 100 includes at least one server 110 that is connected through multiple data transmission links 120. The present invention accesses and updates databases located on a server computer 110 running a server process (hereinafter collectively called "server"). The typical remote server(s) 110 are mainframe computers. These data links are typically wireless links, optical fibers or standard wiring. The network 100 can be an intranet-based (LAN-based), Internet-based (URL-based), or extranet-based (WAN-based) linked network. The server 110 connects with multiple clients 150, 155 (note that only two are shown for clarity). Also, the server 110 can be one or more servers that are interconnected. As shown, the main server 110 is connected through the data links 120 to another statistical server 130 that attaches to databases 160, which contain critical data files and provide statistical analysis. Preferably, the server(s) 110 is a model Gryphon server made by IBM Corporation, Armonk, N.Y., USA, which can execute an operating system (e.g., either Windows NT, LINUX or UNIX, OS/2, AIX, MVS, etc.), which interface with an appropriate application program interface (API). Windows NT, LINUX, OS/2, and UNIX are registered trademarks of their respective corporate entities. The database 160 preferably is a model DB2 database management system also made by IBM which can store and update critical information in a database.

The client workstations 150, 155 (hereinafter collectively called "clients") can be general purpose personal computers (PC) that have windowing-type operating systems configured to run commercially-available graphical user interface (GUI) application such as the Microsoft Windows NT equivalent operating system in a network environment. A typical local (client) workstation 150, 155 for implementing the invention is a general purpose PC. The PC includes a central processing unit (CPU), system memory, a modem or network card for connecting the personal computer to the Internet/Intranet, and a display, and other components such as a keyboard, floppy drive, mouse, etc., shown in FIG. 4. While an exemplary local (client) workstation 150 preferably is a general purpose PC, as will be readily appreciated by those skilled in the art, other types and configurations of computers may be used.

Figure 2:
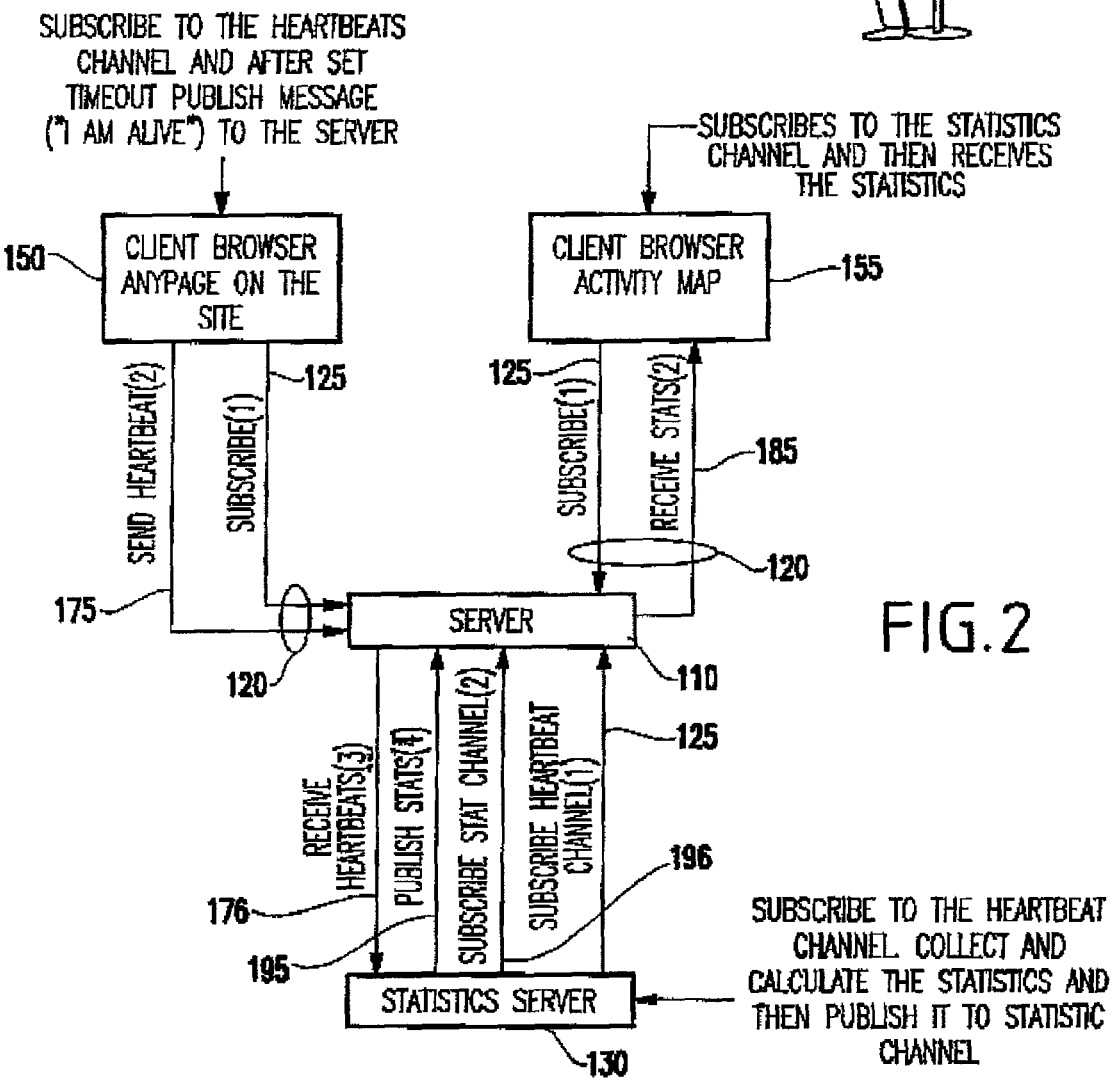
FIG. 2 is a block diagram showing a network incorporating the present invention.

Since all client and server computers will have, for the purposes of the present invention, the same properties, for simplicity of illustration and description, FIG. 2 and the following description illustrate and describe, respectively, the interaction between two local (client) computers 150, 155 and a single remote (server) computer 110. In this regard, as will be better understood from the following description, the present invention is preferably implemented as part of a computer program executing partially on the two local (client) computer and partially on one or more remote (server) computers.

As shown in FIG. 2, running on the (client) computer 150, 155 is a client process, specifically, a browser running a Java-based application referred to herein as a "heartbeat" application. Running on the remote (server) computer 110 is a corresponding server process operating through the client to a server application which itself includes objects. In the context of the present invention, the server 110 may be any persistent object server which may be implemented, for example, in conventional database management systems, recoverable stream files, etc. The client objects, when invoked, send messages to server objects whose methods they wish in turn to invoke. In the invention, a heartbeat application is a java application and is discussed in more detail below.

Note that the operational capability of the GUI interface of the windowing system is fundamental to, but distinct from, the invention. The client workstation 150 is typically capable of supporting concurrent execution of a plurality of application programs such as a browser. These application programs are interfaced through a navigator function that is joined conventionally to the GUI. The GUI operating system is a software system which allows a client to directly manipulate the application programs by conventional I/O devices that include a CRT display, a keyboard, a mouse, or other user specified devices in any combination (e.g., FIG.

4). A file manager is also provided which opens, maintains, and closes files on behalf of the navigator function and the graphical user interface. The file manager operates in conjunction with one or more peripheral storage devices such as a direct access storage device (hard disk drive). The GUI operates conventionally as a windowing system well known in the software arts. One of the many advantages of such GUIs include quick and easy platforms for displaying frequently used or required data by selecting and manipulating graphical display elements, such as icons, with a pointing device, such as a mouse.

The browser that can run on the client workstations 150, 155 include Netscape's Navigator or Microsoft's Explorer browser (Registered Trademarks of Netscape and Microsoft Corporations). To use the invention, all clients (150, 155) must be subscribers of the statistics channel 125 (heartbeat channel) that connect to the statistics server 130. The browser is an application configured on the workstation 150. The browser provides a "container" wherein multiple active applications operate that can use Sun Computer's Java programming language or Microsoft ActiveX/OCX "object" technology to implement application objects. It is understood, however, that application objects can be any application that meets the API specifications of the GUI.

The preferred objects of the invention are "applets" that are part of Java (a trademark of Sun Corporation) programming language developed by Sun Microsystems, Inc. in Mountain View, Calif. Sun defines Java as a simple, object-oriented, distributed, interpreted, robust, secure, architecture neutral, portable, high-performance, multi-read, dynamic, general purpose programing language. Java supports programming for the Internet in the form of these applets. Applets execute within a Java-compatible browser (e.g., Netscape Navigator) by copying code from the server to the client. By using standard hypertext markup language (HTML) syntax for Web-based pages, the Web browser at the client's workstation 150 communicates directly with the server 110. Java programming language provides machine independence and does not care whether a Java application resides on the client computer workstation 150 or the computer server 110. This allows the client's workstation 150 to assemble programs from components that are distributed on diverse nodes of the network 100, whereby downloading of entire program folders from various nodes in the network can be accomplished using JAVA applets.

In particular, the browser installed on the client's workstation 150, 155 that is used to display and edit heartbeat application activity. When using Java language, data is linked through the server 110 to the workstations 150, 155. This raw data is received by the statistics server 130 by Java code, JavaScript, and JavaServer pages as provided by the server 110 that is independent of the source of this information in the network.

The heartbeat application is a web-based, user-friendly navigational GUI using a hyper-linking format that is generated by a statistics server 130 that is broadcasted over a heartbeat activity channel 135 that can be used by the Website server 110 and by subscribing browsers at the local clients 155.

More specifically, as shown in FIG. 2, the clients 150, 155 subscribe to the server 110 using a subscribe heartbeat channel 125. Periodically (after a set time out) the client 150 sends a heartbeat 175 to the server 110 (publishes a message "I am alive"). Such periodic signals allow the server 110 to note that the client 150 is still connected to the server 110. If such periodic signals terminate (if there is no signal within a prescribed time period (e.g., a "time-out")), the server 110 recognizes that the client 150 is no longer subscribed to the server 110. Alternatively, or in addition to the foregoing, the client 150 can send a disconnect signal to the server 110 informing the server that it no longer desires to be connected or to subscribe to the server 110. As discussed in greater detail below, the heartbeat signal 175 is a status signal that includes information that uniquely identifies each individual client and provides data regarding what resources (Web pages) of the server 110 each client is accessing.

An important feature of the invention is that each client 150, 155 subscribes to the server 110 over the subscribe channel 125. This "subscription" allows more elaborate statistical calculations to be made because the activity of each individual client 150, 155 can be monitored once they subscribe. In other words, not only does the heartbeat signal 175 contain a heartbeat shaving a current connection status, the signal also contains data that allows increased statistical tracking (as discussed below). The invention also uniquely identifies each client connected to the server 110 by having each client individually subscribe to the server 110.

The actual subscription process is transparent to the user and does not require any personal or confidential information such as name, address, social security number, etc. Instead, each client is simply identified by their IP address. Once the client has subscribed and the applet has been stored on the client computer 150, 155, the identity of the client is only maintained while the client 150, 155 is actively connected to the server 110. Once the client 150, 155 disconnects from the server 110 (by sending a disconnect signal, or not sending a status signal within the required time), all identification information regarding that client is deleted from the servers 110, 130. If the client later reconnects to the server 110, the activity of the client can once again be tracked for statistical purposes.

Figure 3:
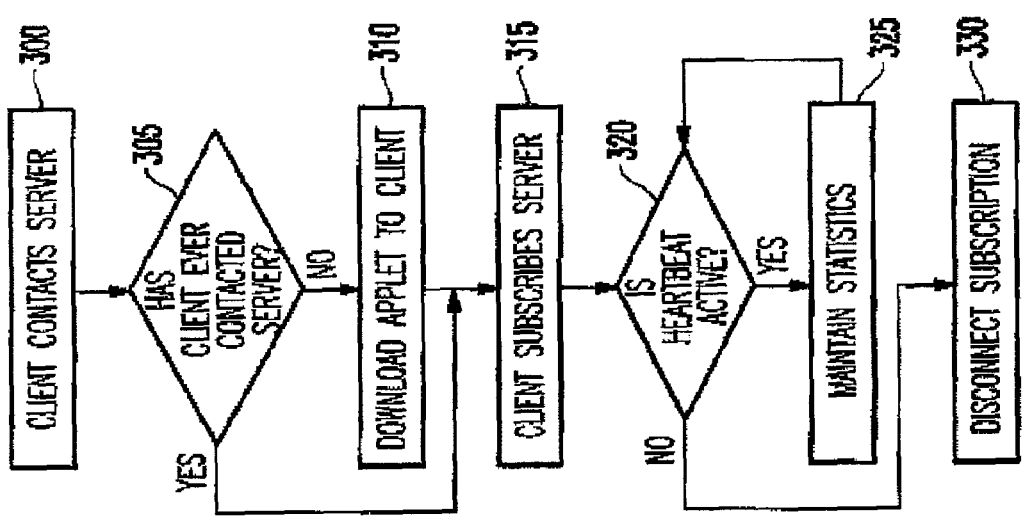
FIG. 3 is a flow diagram illustrating one embodiment of the invention.

FIG. 3 is a flowchart that represents the subscription and connection process between the client 150, 155 and the server 110. In item 300, the client 150, 155 contacts the server 110. If the client 150, 155 has not previously contacted the server (item 305), an applet is downloaded from the server 110 to the client 150, 155 as shown in item 310. If the client 150, 155 has previously contacted the server 110, an applet should have been previously stored on the client 150, 155 and there should be no need to download the applet 310. To perform such processing, when the client makes contact with the server 110, the server interrogates the client computer to determine if an applet is present. If an applet is not present (or if the applet is not the most current version), an applet is downloaded from the server 110 to the client 155.

In item 315, the client subscribes to the server using the applet. Then, the client 150, 155 maintains its active status with the server 110 by periodically sending the heartbeat signal 175 (which contains identification and location information, as discussed in greater detail below). In item 320, if the heartbeat is still active, the server 110 and statistics server 130 maintain the statistics (as shown in item 325). If the heartbeat is not active or if a disconnect signal has been transmitted (320), the server 110 disconnects the subscription and removes the unique identification information of the client 150, 155, as shown in item 330.

Therefore, the invention provides an improved system for maintaining statistics of clients 150, 155 connected to a server 110 by having the clients 150, 155 subscribe 125 to the server 110. The subscription allows the server 110 and the statistics server 130 to obtain more information from each uniquely identified client that is connected to the server 110 (through the data contained in the heartbeat signal 175 that is discussed in greater detail below).

The server 110 is connected to a statistics server 130 and supplies the received heartbeats 176 to the statistics server 130. In a similar manner to the client's subscription, the statistics server 130 also subscribes to the server 110 using a subscribe statistic channel 196 and maintains its "alive" status through similar heartbeat signals 125. In return, the statistics server 130 determines which clients are still subscribed to the server through the receive heartbeat channel 176. In addition, the statistics server returns the publish statistics 195 to the server 110. Therefore, the server 110 publishes the statistics back to the client 155 on the receive statistic channel 185. This allows another client 155 who has subscribed to the heartbeat channel 125 to receive the various statistics (publish statistics, subscribe statistics, etc.) 185 from the server 110. Thus, the invention facilitates visualizing dynamic user activity on the current site, thus giving a more powerful navigation tool. This will allow the user to see where and what the other users are doing on this Website. For online Discussion and E-Conferences this is one of the most important pieces of information that can be relayed to the user since there is no clear and easy way to find out which discussions or conference rooms are popular among the users. At the same time it facilitates visualization of the dynamic user activity and also facilitates plotting the visual information on a map to identify which geography the users are coming from to different discussions and conference rooms.

Client workstation 155 is specially configured to function as a data browser for accessing the subscribed navigational aid information that is stored in storage device 160 of the statistics server 130. This information is available from the receive statistics channel 185 that is transmitted to the client station 155 from the server 110. This page includes embedded client plug-in programs that coordinate the ordinary browsing of Web pages from a Website with the retrieval and display of usage statistics 195 stored on statistics server 130.

Raw data of Website activity by clients 150 is transmitted over the heartbeat message channel data link 175. When the user leaves the site or follows a link, this activity message stops by not sending a 1 (live) within a given time period or sending a 0 (dead) signal to the server 110 and then onto the statistics server 130. The heartbeat message includes many pieces of information. For example, the heartbeat signal may include at least 3 digits. The first digit uniquely identifies the client (e.g., IP address) and the last 2 digits determine which application activity the user is performing currently (e.g., which server resource (web page) the client is accessing). The aforementioned 3 digit number is only exemplary and can be customized to accommodate more information. This allows the Webmaster to know the status of the user/server and also what geo and in what part of the site each user is located at any instant. This aids in navigation of the Website by displaying this raw data in some navigable format. The aforementioned 3 digits are used with a look-up table provided to the client 150, 155 and server 110.

To achieve a complete correspondence between the components of a Website and usage information, the browser at the workstations 150, 155 are subscribers of the network 100. For example, when the workstation 150 sends a heartbeat 175, usage information for the requested URL is registered in the statistics server 130.

The heartbeat application comprises a client's browser extensions that collect the above data 175 automatically for all accesses made by the clients. This data is collected by the server 130 in response to a request from the client. The request specifies the pages for which the data is to be collected. The pages may all be on the statistics server 130. This request is used by the heartbeat application as the impetus to start collecting the requested data. Depending on the implementation, the activity signal of the client can be monitored continuously in real-time.

Figure 4:
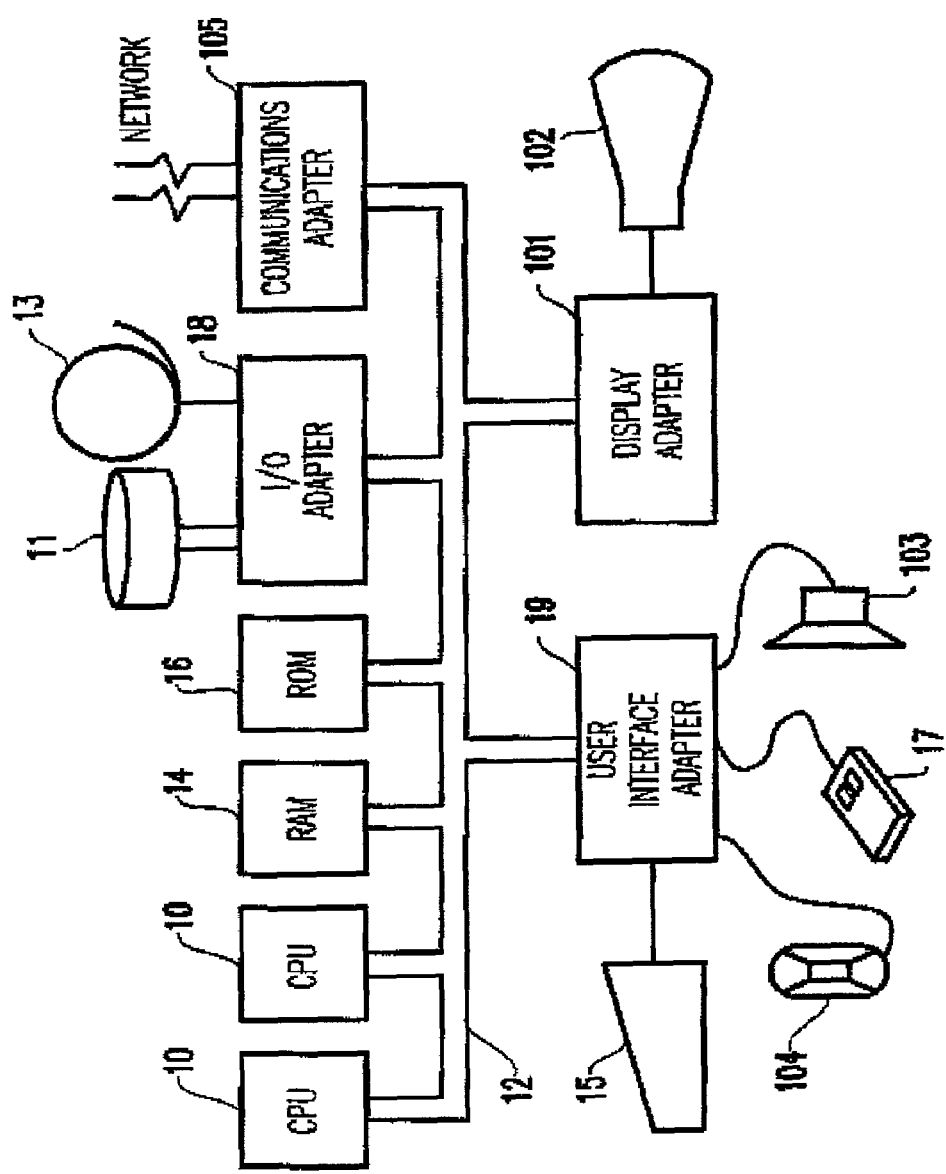
FIG. 4 is a schematic hardware diagram of a computer system for use with the invention.

A representative hardware environment for practicing the present invention is depicted in FIG. 4, which illustrates a typical configuration of an information handling/computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as touch screen device (not shown) to bus 12, communication adapter 105 for connecting the information handling system to a data processing network, and display adapter 101 for connecting bus 12 to display device 102. A program storage device readable by the disk or tape units, is used to load the instructions which operate on the invention which is loaded also loaded onto the computer system.

The heartbeat application plug-in need not be permanently included in clients 150,155. Rather, these extension plug-ins may be included in the server requests to clients to activity data. Such extensions can be installed on a client by a capability, such as the Microsoft Corp. Active X capability that enables browser to attach "add-ons" to itself, or the Netscape Corp. "plug-ins" capability that enables browser to attach "plug-ins" to itself. "Add-ons" or "plug-ins" are applets, scripts, or other programs that can be added to a browser to enhance its capabilities. Given such an implementation of extensions, upon receipt of the request to collect Website activity data, the receiving browser attaches to itself the received "add-on" or "plug-in" that implements the heartbeat application plug-in and executes it.

The invention is highly scalable since it requires a very small 20 k message to be sent between the client and server to determine the information required, thus maximizing the network user for other important applications. One of the benefits of the invention is that it facilitates visualization of the Website traffic dynamically. This information allows the user to make smarter navigational decisions. The solution works independently of any Webserver so there is no dependency on what type of the Webserver or the Webserver log format. It is highly customizable and reusable for any other application that needs to display such information. The invention can be easily used in other applications since it is a java based solution. Applications that can use this include any Website that needs to keep track of users in a geo basis, any application that needs to know where the users are and what they are doing. This invention can be used to track the users from multiple servers, and determine what particular site/server is popular.

In today's server client networking systems there is a well-known send-receive status check mechanism that allows the servers to determine if clients are still connected. This methodology uses a dedicated network link between the server and client to determine if the client is connected or not. The methodology in this invention is different in a number of aspects. For example, the invention provides that the clients subscribe to the server to increase the data that can be tracked statistically. With the invention, there is no dedicated connection. Instead, the invention uses JMS (Java Messaging Services) to achieve the "heartbeat" like structure where the client sends an acknowledge message to the server to maintain the connection. Therefore, by providing a system whereby clients subscribe to a server, the real-time demands being made upon the server can be determined with greater accuracy. By including an independent application running on each client, the server does not need to maintain a continuous connection with each client. However, by including the identification and connection information in the "heartbeat" status signal, the invention increases the amount of statistical server usage information available, even without such a continuous connection. Therefore, the invention provides, in a disconnected environment, the type of information that was previously only available through continuous client connections, thereby saving substantial bandwidth for other applications.

While the invention has been described in terms of preferred embodiments, those skilled in the art will recognize that the invention can be practiced with modification within the spirit and scope of the appended claims.

What is claimed is:

1. A system for monitoring a communication connection between a client computer and a server application in a disconnected environment where there is no continuous connection between said client computer and said server application, running on a server computer, connected to said client computer over a network, said system comprising:
    a client application running on said client computer,
    wherein said client application subscribes to said server application and periodically sends a status signal to said server application in said disconnected environment so long as said client application continues to use resources of said server computer, and
    wherein continued receipt of said status signal by said server computer informs said server application that said client computer is maintaining a connection with said server computer and said status signal comprises data identifying resources currently being used by said client computer, and
    wherein said server application maintains statistics regarding client demand on server resources based on information within said status signal.

2. The system in claim 1, all the limitations of which are incorporated herein by reference, wherein if said server application does not receive said status signal from said client application within a predetermined time period, said server application determines that said client computer is no longer connected to said server computer.

3. The system in claim 1, all the limitations of which are incorporated herein by reference, wherein said client application is sent from said server application to said client computer when said client computer initially forms a connection with said server computer.

4. The system in claim 1, all the limitations of which are incorporated herein by reference, wherein said client application is a self contained application that runs on said client computer independently of said server application.

5. The system in claim 1, all the limitations of which are incorporated herein by reference, wherein said status signal uniquely identifies said client computer.

6. The system in claim 1, all the limitations of which are incorporated herein by reference, wherein said status signal comprises a disconnection signal that informs said server application that said client computer is disconnecting from said server computer.

7. A system for monitoring a communication connection between a client application, running on a client and a server computer connected to said client computer over a network in a disconnected environment wherein there is no continuous connection between said client computer and said server application, said system comprising:
    a server application running on said server computer,
    wherein said client application subscribes to said server application and periodically sends a status signal to said server application in said disconnected environment so long as said client application continues to use resources of said server computer, and
    wherein continued receipt of said status signal by said server computer informs said server application that said client computer is maintaining a connection with said server computer and wherein said status signal comprises data identifying resources currently being used by said client computer, and
    wherein said server application maintains statistics on client computer connections based on said status signal received from said client application such that said status signals allow said server application to transparently track activity of said client computer in said disconnected environment.

8. The system in claim 7, all the limitations of which are incorporated herein by reference, wherein if said server application does not receive said status signal from said client application within a predetermined time period, said server application determines that said client computer is no longer connected to said server computer.

9. The system in claim 7, all the limitations of which are incorporated herein by reference, wherein said client application is sent from said server application when said client computer initially forms a connection with said server computer.

10. The system in claim 7, all the limitations of which are incorporated herein by reference, wherein said client application is a self-contained application that runs on said client computer independently of said server application.

11. The system in claim 7, all the limitations of which are incorporated herein by reference, wherein said status signal uniquely identifies said client computer.

12. The system in claim 7, all the limitations of which are incorporated herein by reference, wherein said status signal comprises a disconnection signal that informs said server application that said client computer is disconnecting from said server computer.

13. The system in claim 7, all the limitations of which are incorporated herein by reference, wherein said client application comprises an applet.

14. A method for monitoring a communication connection between a client computer and a server application, running on a server computer connected, to said client computer over a network in a disconnected environment where there is no continuous connection between said client computer and said server application, said method comprising:
    sending, by said server application, a client application to said client computer when said client computer establishes communication with said server computer;
    subscribing, by said client application, to said server application, and
    periodically sending, by said client application, a status signal to said server application in said disconnected environment so long as said client application continues to use resources of said server computer,
    wherein continued receipt of said status signal by said server computer informs said server application that said client computer is maintaining a connection with said server computer, wherein said status signal comprises data identifying resources currently being used by said client computer, and wherein said server application maintains statistics regarding client demand on server resources based on information within said status signal.

15. The method in claim 14, all the limitations of which are incorporated herein by reference, wherein if said server application does not receive said status signal from said client application within a predetermined time period, said server application determines that said client computer is no longer connected to said server computer.

16. The method in claim 14, all the limitations of which are incorporated herein by reference, wherein said client application is a self-contained application that runs on said client computer independently of said server application.

17. The method in claim 14, all the limitations of which are incorporated herein by reference, wherein said status signal uniquely identifies said client computer.

18. The method in claim 14, all the limitations of which are incorporated herein by reference, wherein said status signal comprises a disconnection signal that informs said server application that said client computer is disconnecting from said server computer.

19. A method for monitoring a communication connection between a client application, running on a client computer, and a server computer connected to said client computer over a network in a disconnected environment where there is no continuous connection between said client computer and said server application said method comprising:

sending, by a server application running on said server computer, said client application to said client computer when said client computer establishes communication with said server computer;

subscribing, by said client application, to said server application; and periodically sending, by said client application, a status signal to said server application in said disconnected environment so long as said client application continues to use resources of said server computer, wherein continued receipt of said status signal by said server computer informs said server application that said client computer is maintaining a connection with said server computer wherein said status signal comprises data identifying resources currently being used by said client computer, and wherein said server application maintains statistics on client computer connections based on status signals received from said client application such that said status signals allow said server application to transparently track activity of said client computer in said disconnected environment.

20. The method in claim 19, all the limitations of which are incorporated herein by reference, wherein if said server application does not receive said status signal from said client application within a predetermined time period, said server application determines that said client computer is no longer connected to said server computer.

21. The method in claim 19, all the limitations of which are incorporated herein by reference, wherein said client application is a self-contained application that runs on said client computer independently of said server application.

22. The method in claim 19, all the limitations of which are incorporated herein by reference, wherein said status signal uniquely identifies said client computer.

23. The method in claim 19, all the limitations of which are incorporated herein by reference, wherein said status signal comprises a disconnection signal that informs said server application that said client computer is disconnecting from said server computer.

24. The method in claim 19, all the limitations of which are incorporated herein by reference, wherein said client application comprises an applet.

25. A program storage device readable by machine tangibly embodying a program of instructions executable by the machine to perform a method for monitoring a communication connection between a client computer and a server application, running on a server computer connected, to said client computer over a network in a disconnected environment where there is no continuous connection between said client computer and said server application, said method comprising:

sending, by said server application, a client application to said client computer when said client computer establishes communication with said server computer;

subscribing, by said client application, to said server application; and periodically sending, by said client application, a status signal to said server application in said disconnected environment so long as said client application continues to use resources of said server computer, wherein continued receipt of said status signal by said server computer informs said server application that said client computer is maintaining a connection with said server computer, wherein said status signal comprises data identifying resources currently being used by said client computer, and wherein said server application maintains statistics regarding client demand on server resources based on information within said status signal.

26. The device in claim 25, all the limitations of which are incorporated herein by reference, wherein if said server application does not receive said status signal from said client application within a predetermined time period, said server application determines that said client computer is no longer connected to said server computer.

27. The device in claim 25, all the limitations of which are incorporated herein by reference, wherein said client application is a self-contained application that runs on said client computer independently of said server application.

28. The device in claim 25, all the limitations of which are incorporated herein by reference, wherein said status signal uniquely identifies said client.

29. The device in claim 25, all the limitations of which are incorporated herein by reference, wherein said status signal comprises a disconnection signal that informs said server application that said client computer is disconnecting from said server computer.

* * * * *